United States Patent
Walrant

(10) Patent No.: US 11,251,989 B2
(45) Date of Patent: Feb. 15, 2022

(54) SECURE BRIDGING OF CONTROLLER AREA NETWORK BUSES

(71) Applicant: NXP B.V., Eindhoven (NL)

(72) Inventor: Thierry G. C. Walrant, Bouge (BE)

(73) Assignee: NXP B.V., Eindhoven (NL)

( * ) Notice: Subject to any disclaimer, the term of this patent is extended or adjusted under 35 U.S.C. 154(b) by 361 days.

(21) Appl. No.: 16/359,232

(22) Filed: Mar. 20, 2019

(65) Prior Publication Data

US 2020/0304337 A1 Sep. 24, 2020

(51) Int. Cl.
*H04L 12/00* (2006.01)
*H04L 12/40* (2006.01)

(52) U.S. Cl.
CPC .. *H04L 12/40104* (2013.01); *H04L 12/40091* (2013.01); *H04L 2012/40215* (2013.01); *H04L 2012/40273* (2013.01)

(58) Field of Classification Search
CPC ......... H04L 12/40104; H04L 12/40091; H04L 2012/40273; H04L 2012/40215
See application file for complete search history.

(56) References Cited

U.S. PATENT DOCUMENTS

| | | | | |
|---|---|---|---|---|
| 7,539,888 B2* | 5/2009 | Hu | ..................... | H04L 12/40039 713/320 |
| 7,855,573 B1* | 12/2010 | Yost | ..................... | G06F 13/4086 326/30 |
| 9,756,590 B2* | 9/2017 | Koenigseder | ......... | H04W 40/20 |
| 9,860,304 B2* | 1/2018 | de Bes | .............. | H04L 12/40182 |
| 10,103,901 B2* | 10/2018 | Wu | ..................... | H04L 12/1881 |
| 2012/0278507 A1* | 11/2012 | Menon | ..................... | H04L 12/40 709/248 |
| 2014/0334568 A1* | 11/2014 | Gotou | ............... | H04L 12/40189 375/271 |
| 2017/0078884 A1* | 3/2017 | Tanabe | ................ | H04L 63/0876 |
| 2017/0093659 A1* | 3/2017 | Elend | ..................... | H04L 43/08 |
| 2018/0084412 A1* | 3/2018 | Alfred | ..................... | H04L 9/088 |

FOREIGN PATENT DOCUMENTS

| | | |
|---|---|---|
| CN | 107878363 A | 4/2018 |
| EP | 3 148 154 A1 | 3/2017 |
| EP | 3 297 247 A1 | 3/2018 |
| GB | 2537572 A | 10/2016 |

* cited by examiner

*Primary Examiner* — Rasheed Gidado

(57) ABSTRACT

A vehicle network system is disclosed. The vehicle network system includes a first controller area network (CAN) bus including a first node and a first secure transceiver and a second CAN bus including a second node and a second secure transceiver, a gateway to enable transmission of a CAN message from the first node to the second node. The vehicle network system also includes an auxiliary communication link to transmit an auxiliary data derived from the CAN message from the first secure transceiver to the second secure transceiver.

20 Claims, 2 Drawing Sheets

SECURE BRIDGING OF CONTROLLER AREA NETWORK BUSES

BACKGROUND

Controller area network (CAN) bus is a message-based communications bus protocol that is often used within automobiles. The CAN bus protocol is used to enable communications between various electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The data link layer of the CAN protocol is standardized as International Standards Organization (ISO) 11898-1.

One growing concern with in-vehicle networks, such as in-vehicle networks that use the CAN bus protocol, is network security. For example, a compromised in-vehicle network could allow an attacker to maliciously control components of a vehicle.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a vehicle network system is disclosed. The vehicle network system includes a first controller area network (CAN) bus including a first node and a first secure transceiver and a second CAN bus including a second node and a second secure transceiver, a gateway to enable transmission of a CAN message from the first node to the second node. The vehicle network system also includes an auxiliary communication link to transmit a auxiliary data derived from the CAN message from the first secure transceiver to the second secure transceiver.

In some examples, the CAN message is transmitted using a CAN protocol and the auxiliary data is transmitted via the auxiliary communication link using a protocol that is different from the CAN protocol. In one embodiment, the auxiliary communication link goes through the gateway. The first secure transceiver and the second secure transceiver may be fabricated in a same integrated circuit. If the first secure transceiver and the second secure transceiver are fabricated in a same integrated circuit, the auxiliary communication link connects the first secure transceiver and the second secure transceiver inside the integrated circuit, therefore, the auxiliary communication link may not be exposed to any entity outside of the integrated circuit. In some examples, the integrated circuit includes multiple secure transceivers may include one or more pins to connect the auxiliary communication link from one integrated circuit to another integrated circuit, each of which may include multiple secure transceivers.

The gateway may include a processor or a circuit to generate a shared key and send the shared to the first secure transceiver and the second secure transceiver. The gateway may be configured to generate the shared key at each boot. In some embodiments, a secure boot technique may be employed to provide boot time security. A new shared key may be generated at each boot of the gateway. The first and second secure transceivers include a memory to store the shared key. The first and second secure transceivers may be configured such that the shared key is not readable from an external interface of the first or second secure transceiver. The gateway may be configured to discard the secure key after distributing the shared key to the secure transceivers.

In some examples, the auxiliary communication link conforms to a serial peripheral interface (SPI) specification used for short distance communication within systems. Other interfaces that are suitable for a component to component data transfer within a system may also be used instead of an SPI compatible interface. For example, when the auxiliary communication link is within an integrated circuit that includes the first and second secure transceivers, the auxiliary communication link may be a custom interface that is suitable for transmitting a data (e.g., the auxiliary data) from the first secure transceiver to the second secure transceiver within the integrated circuit.

In some examples, the first secure transceiver may be configured to generate the auxiliary data using the shared key and the CAN message to be transmitted to the second secure transceiver and transmit the auxiliary data to the second secure transceiver through the auxiliary communication link. The second secure transceiver is configured to verify or validate the CAN message using the information included in the received auxiliary data. The second secure transceiver is configured to invalidate the CAN message if the CAN message is not found to be authorized based on the information included in the auxiliary data.

In some examples, the auxiliary data includes a timing or CAN message freshness information to prevent an old signature being used to validate the CAN message. The auxiliary data may include an identification of the first secure transceiver. The auxiliary data may also include an information that is derived from a header of the CAN message and an information that is derived from a payload of the CAN message.

In another embodiment, a method for validating a controller area network (CAN) message is disclosed. The method includes generating a auxiliary data using a shared key and the CAN message at a transmitting node on a first CAN bus, transmitting the CAN messages to a destination node at a second CAN bus through a CAN gateway using CAN protocol, transmitting the auxiliary data using an auxiliary communication link separate from the first CAN bus and the second CAN bus and validating, at the second node, the CAN message based on the auxiliary data and invalidating the CAN message if the validation fails.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

Figure 1:
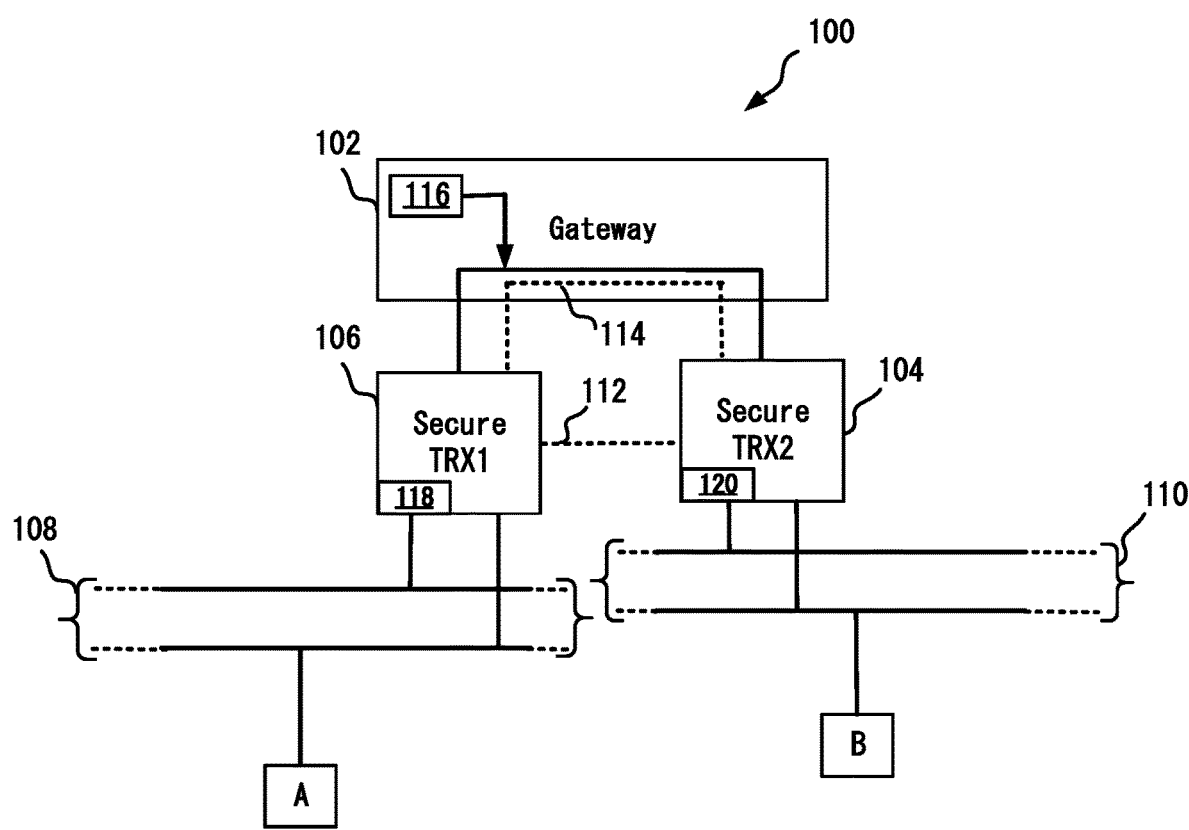
FIG. 1 depicts a vehicle network system in accordance with one or more embodiments of the present disclosure.

Note that figures are not drawn to scale. Intermediate steps between figure transitions have been omitted so as not to obfuscate the disclosure. Those intermediate steps are known to a person skilled in the art.

DETAILED DESCRIPTION

Many well-known manufacturing steps, components, and connectors have been omitted or not described in details in the description so as not to obfuscate the present disclosure. For example, a detailed discussion of a secure transceiver and controller area network (CAN) is being omitted. A secure transceiver and CAN are described in application Ser. No. 14/868,223 filed on Sep. 28, 2015 entitled "CONTROLLER AREA NETWORK (CAN) DEVICE AND METHOD FOR CONTROLLING CAN TRAFFIC", which is incorporated herein by reference in its entirety. The embodiments described herein modifies the secure transceiver, an example of thereof is provided in the above noted patent application, among other things, by adding an auxiliary communication port. It should be noted that the above noted reference described a secure transceiver just as an example and other implementations of a secure transceiver are possible. A secure transceiver is a transceiver that stops propagation of a CAN message from an unauthorized source on a CAN bus.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In some examples, a secure transceiver (TRX) may include a mapping table that includes an identification and CANID (Controller Area Network Identification) or code of a node (e.g., ECU or MCU) on a CAN bus. The mapping table may include a plurality of identification—CANID pairs. If a node on the CAN bus attempt to send a code, the secure transceiver checks the mapping table to determine if the node that transmitted the code is authorized to transmit that code. If not, the secure transceiver invalidates the CAN message. The secure transceiver may also stop the CAN message from further propagation on the CAN bus. This technique works well when all nodes are on the same CAN bus. However, when there are two or more CAN buses each coupled together using a gateway, the messages from a node on a first CAN bus may go through the gateway to a node on the second CAN bus without a verification. A secure transceiver on the receiver CAN bus may not determine the originating node because the CAN message appears to have originated from the gateway, consequently, may fail to validate the received CAN message. In some examples, a malicious gateway component or malicious nodes may be added (or a malicious programming may be executed on a gateway or a node) on a CAN bus to send spurious codes.

FIG. 1 shows a vehicle network system 100. The vehicle network system 100 includes a first CAN bus 108 that includes Node A and a secure transceiver TRX1 106. The vehicle network system 100 also includes a second CAN bus 110 that includes Node B and a secure transceiver TRX2 104. Node A and Node B may also include a secure transceiver (not shown) coupled to an ECU or a microcontroller. These secure transceivers may be different from the first secure transceiver TRX1 106 and the second secure transceiver TRX2 104. The secure transceiver TRX1 106 and the secure transceiver TRX2 104 are communicatively coupled together through a gateway 102 that is configured to enable CAN data transmission between the between the CAN bus 108 and the CAN bus 110. The gateway 102 may include a processor or circuit 116 that is configured to control the data transmission operations between the first CAN bus 108 and the second CAN bus 110. The processor 116 may further be configured to generate a secret shared key. In some embodiments, a new secret shared key is generated every time the gateway 102 is booted or powered on. In some example, the gateway 102 sends the generated shared key to the secure transceiver TRX1 106 and the secure transceiver TRX2 104 and then may discard the shared key from its memory or storage. The secure transceiver TRX1 106 and the secure transceiver TRX2 104 include memory areas 118, 120 to store the shared key that is received from the gateway 102. When a new shared key is received, the previously received key may be discarded by the secure transceiver TRX1 106 and the secure transceiver TRX2 104. In some examples, the shared key is stored in the secure transceiver TRX1 106 and the secure transceiver TRX2 104 that the shared key cannot be read from the outside of the circuit that implements the secure transceiver TRX1 106 and the secure transceiver TRX2 104. That is, the secure transceivers 106, 104 may be configured not to provide access to the memory areas 118, 120 through an external port.

The vehicle network system 100 also includes an auxiliary communication link 114 that goes through the gateway 102. In some examples, the auxiliary communication link 114 may be implemented using a link that conforms to a serial peripheral interface (SPI) standard or a similar mechanism that allows transfer of data between internal components of the vehicle network system 100. In some embodiments, the secure transceiver TRX1 106 and the secure transceiver TRX2 104 may be fabricated in a same integrated circuit. In such cases, an auxiliary communication link 112 may be used within the integrated circuit instead of the auxiliary communication link 114 through the gateway 102. In some examples, if the auxiliary communication link is internal to the integrated circuit that includes a plurality of secure transceivers, the shared key may not be needed. An auxiliary data may be derived from the CAN message and sent on the auxiliary communication link 114. In some examples, when the auxiliary communication link 112 is used, the auxiliary data may be generated without the use of a cryptography operation.

The auxiliary data may be generated by the secure transceiver TRX1 106 (or by the secure transceiver TRX2 104 if a CAN message is transmitted from Node B to Node A) using the shared key. The auxiliary data can be derived from either some or all parts of the CAN message and the auxiliary data may include a message timing information for replay protection. In some examples, a counter may be used for the timing information. In some other examples, a time stamp may be used for the timing information. A signature may be generated using the shared key and may be included in the auxiliary data. A new signature may generated for every CAN message that is transmitted from Node A to Node B. In some embodiments, the auxiliary data includes, at the very least, the identification of the secure transceiver TRX1 106 and CANID. The receiving side secure transceiver (e.g., the secure transceiver TRX2 104) may include a white list (e.g., the mapping table) to verify, based on the received auxiliary data, if the CAN message came from an authorized source. If no auxiliary data is received by the secure transceiver TRX2 104 or based on the received auxiliary data if the secure transceiver TRX2 104 determines that the gateway has sent a unauthorized CANID, the CAN message is invalidated.

In one example, the signature may be generated through the formula Signature1=SignGeneration (K, CAN1+Tid+C) using mechanisms such as cipher based message authentication code (CMAC). K is the shared key, CAN1 is the CAN message received from Node A, Tid is the transceiver identification of the secure transceiver TRX1 106 and C is the freshness information, for example, a counter that is incremented with each CAN message. The auxiliary data that is sent via the auxiliary communication link may include Signature1+Tid+C. At the secure transceiver TRX2 104, the CAN message can be verified by checking if C received in the auxiliary data is higher than the counter (Q) from the last received auxiliary data stored in the secure transceiver TRX2 104. If Q>=C, CAN transmission is aborted. The secure transceiver TRX2 104 may also compare source identifier from the auxiliary data with the transceiver identification and if they are not the same, the transmission of the CAN message to Node B is aborted. In some examples, the signature using the method described above may be generated at the secure transceiver TRX2 104 using C+1 as freshness value and Tid from the auxiliary data received from the secure transceiver TRX1 106 and the two signatures may be compared to verify the signature received in the auxiliary data. If the comparison fails, the transmission of the CAN message is aborted.

Figure 2:
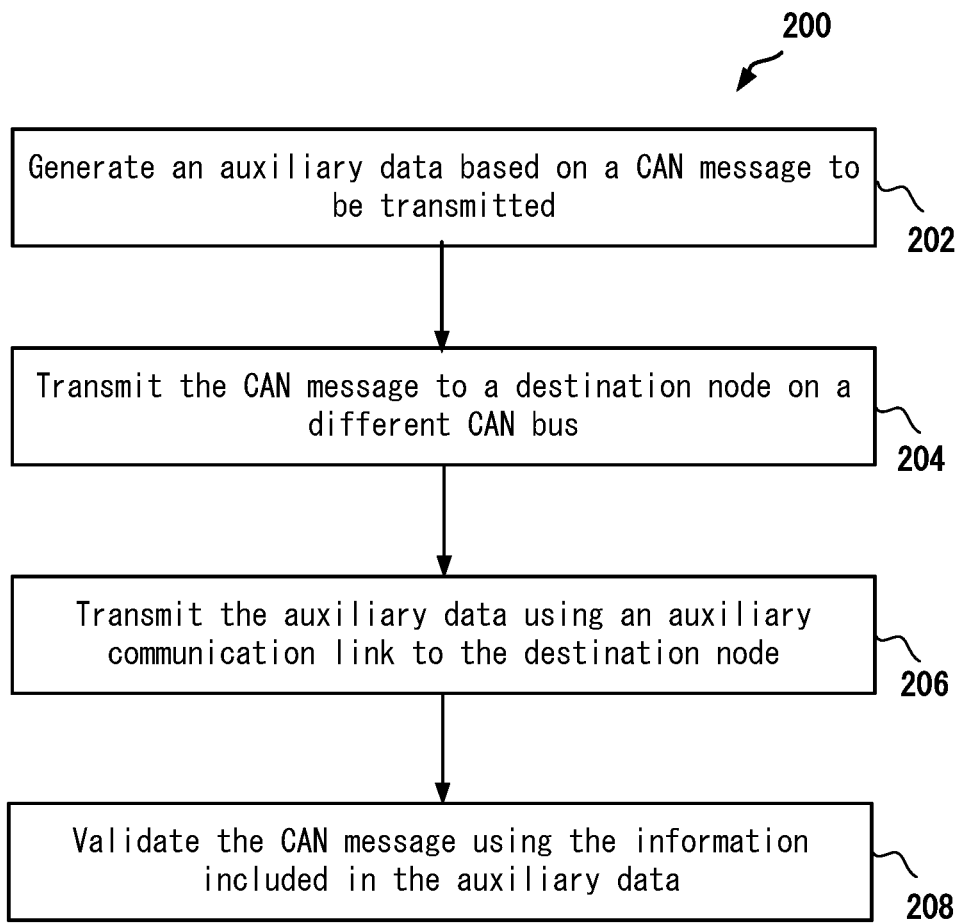
FIG. 2 depicts a method for validating a CAN message in accordance with one or more embodiments of the present disclosure.

FIG. 2 shows a method 200 for validating a CAN message transmitted from a first node to a second node. Accordingly, at step 202, an auxiliary data is generated based on a shared key and the CAN message to be transmitted from the first node on a first CAN bus to the second node on a second CAN bus. The shared key may be generated by a gateway that couples the first CAN bus and the second CAN bus. At step 204, the CAN message is transmitted to the second node on the second CAN bus using a CAN protocol. At step 206, the auxiliary data is transmitted to the second node using an auxiliary communication link that is different from the first CAN bus or the second CAN bus. The auxiliary communication link may be implemented using a protocol (e.g., SPI) that is suitable for transmission of messages at short distances, for example, between components of a system. In some embodiments, step 206 may be executed prior to step 204. At step 208, the second node at the second CAN bus validates the received CAN message using the information included in the auxiliary data. The CAN message is invalidated if the verification fails. The auxiliary data may be generated using cryptographic operations using the shared key and the CAN message. In some examples, the first node and the second node may be secure transceivers coupled to the first CAN bus, the second CAN bus and the gateway.

As evident from the description above, the advantages of the embodiments include that no additional CAN bus bandwidth is needed for a secure CAN messaging between two CAN buses. Further, no changes in the CAN message structure or the CAN protocol is needed. It should be noted that even though the embodiments herein are being described using a secure transceiver, a person skilled in the art would appreciate that these embodiments may also be practiced in the context of CAN controller to CAN controller communication.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A vehicle network system, comprising:
a first controller area network (CAN) bus including a first node and a first secure transceiver;
a second CAN bus including a second node and a second secure transceiver;
a gateway to enable transmission of a CAN message from the first node to the second node; and
an auxiliary communication link to transmit an auxiliary data derived from the CAN message from the first secure transceiver to the second secure transceiver, wherein the second secure transceiver is configured to validate the CAN message received from the first secure transceiver based on the auxiliary data.

2. The vehicle network system of claim 1, wherein the CAN message is transmitted using a CAN protocol and the auxiliary data is transmitted via the auxiliary communication link using a protocol that is different from the CAN protocol.

3. The vehicle network system of claim 1, wherein the auxiliary communication link goes through the gateway.

4. The vehicle network system of claim 1, wherein the first secure transceiver and the second secure transceiver are fabricated in a same integrated circuit and the auxiliary communication link connects the first secure transceiver and the second secure transceiver within the same integrated circuit.

5. The vehicle network system of claim 1, wherein the auxiliary data includes a signature generated using a shared key, an identification of the first secured transceiver, and a message counter.

6. The vehicle network system of claim 1, wherein the auxiliary data includes an identification of the first secure transceiver and a message counter.

7. The vehicle network system of claim 1, wherein the second secure transceiver includes a mapping table that includes identification of the first secure transceiver and a code that the first secure transceiver is authorized to transmit.

8. The vehicle network system of claim 1, wherein the gateway includes a processor to generate a shared key and send the shared key to the first secure transceiver and the second secure transceiver.

9. The vehicle network system of claim 8, wherein the gateway is configured to generate the shared key at each secure boot of the vehicle network system.

10. The vehicle network system of claim 8, wherein the first and second secure transceivers include a memory to store the shared key.

11. The vehicle network system of claim 10, wherein the first and the second secure transceivers are configured such that the shared key is not readable using an external interface of the first and second secure transceivers.

12. The vehicle network system of claim 8, wherein the first secure transceiver is configured to generate the auxiliary data based on the CAN message and the shared key using a cryptographic operation and transfer the auxiliary data to the second secure transceiver through the auxiliary communication link.

13. The vehicle network system of claim 1, wherein the auxiliary communication link is a serial peripheral interface.

14. The vehicle network system of claim 1, wherein the second secure transceiver is configured to validate the CAN message using the auxiliary data.

15. The vehicle network system of claim 14, wherein, based on the auxiliary data, the second secure transceiver is configured to invalidate the CAN message if the CAN message is not found to be authorized based on one or more of a message counter and an identification of the first secure transceiver.

16. The vehicle network system of claim 1, wherein the auxiliary data includes a message counter to prevent an old auxiliary data being used to validate the CAN message.

17. The vehicle network system of claim 1, wherein the auxiliary data includes one or more of an identification of the first secure transceiver and an information that is derived from a header of the CAN message and an information that is derived from a payload of the CAN message.

18. A method for validating a controller area network (CAN) message, the method comprising:
generating an auxiliary data using a shared key and the CAN message at a transmitting node on a first CAN bus;
transmitting the CAN messages to a destination node at a second CAN bus through a CAN gateway using CAN protocol;
transmitting the auxiliary data using an auxiliary communication link separate from the first CAN bus and the second CAN bus; and
validating, at the destination node, the CAN message based on the auxiliary data and invalidating the CAN message if the validation fails.

19. The method of claim 18, wherein the auxiliary data includes one or more of an identification of the first secure transceiver and an information that is derived from a header of the CAN message and an information that is derived from a payload of the CAN message.

20. The method of claim 19, wherein the auxiliary data includes an identification of the first secure transceiver and a message counter.

* * * * *